United States Patent [19]

Armstrong, Jr.

[11] 4,030,073
[45] June 14, 1977

[54] INITIALIZATION CIRCUIT FOR ESTABLISHING INITIAL OPERATION OF A DIGITAL COMPUTER

[75] Inventor: Robert A. Armstrong, Jr., Stow, Mass.

[73] Assignee: Digital Equipment Corporation, Maynard, Mass.

[22] Filed: Nov. 5, 1975

[21] Appl. No.: 629,028

[52] U.S. Cl. .......................................... 340/172.5
[51] Int. Cl.² .......................................... G06F 3/00
[58] Field of Search ............................... 340/172.5,

[56] References Cited

UNITED STATES PATENTS

| 3,321,747 | 5/1967 | Adamson | 340/172.5 |
| 3,470,538 | 9/1969 | Harbaugh | 340/172.5 |
| 3,517,171 | 6/1970 | Avizienis | 340/172.5 X |
| 3,535,560 | 10/1970 | Cliff | 340/172.5 X |
| 3,736,569 | 5/1973 | Bouricius et al. | 340/172.5 |
| 3,909,790 | 9/1975 | Shapiro et al. | 340/172.5 |

Primary Examiner—Melvin B. Chapnick
Attorney, Agent, or Firm—Cesari and McKenna

[57] ABSTRACT

A circuit for initializing a digital computer. Whenever an operator turns on a power supply for the digital computer or activates a console switch, the circuit transmits overriding address signals. These signals divert the digital computer from a normal initializing routine to a routine provided by the initializing circuit. The routine in the initializing circuit includes digital computer instruction sequences for performing preliminary diagnostic operations and for transferring instructions to a main memory from preselected peripherals. When the routine is complete, the computer is prepared to process other programs and to operate with other peripherals.

5 Claims, 3 Drawing Figures

INITIALIZATION CIRCUIT FOR ESTABLISHING INITIAL OPERATION OF A DIGITAL COMPUTER

BACKGROUND OF THE INVENTION

This invention generally relates to digital computers for use in data processing systems and more specifically to the establishment of initial operating conditions in such digital computers.

A conventional data processing system includes a digital computer for processing data in response to a sequence of instructions in a program, a random access memory which stores the data and instructions, and peripherals which transfer information to and from the digital computer, the random access memory or other peripherals. In addition, the digital computer conventionally includes an operator's console. The console typically contains switches for loading address and data signals into the digital computer and also for controlling data and address transfers between the console and the digital computer. It also contains lights for displaying the contents of various locations and other information concerning the status of the digital computer.

When it is desired initially to energize a conventional data processing system, there are generally no instructions in the random access memory to guide the digital computer. Similarly, the contents of the memory essentially are erased if it does not retain information when the power supply is turned off. In either case, a system operator uses the console switches to manually load a "bootstrap" program into the memory. The bootstrap program usually contains a few instructions which can then be processed by the digital computer to bring in other instructions or data in a second program. The second program might comprise a "bootstrap loader" which contains instructions for reading information from a particular peripheral, such as a keyboard or tape reader. When the random access memory contains this information, the digital computer can thereafter coact with the peripheral to transfer other programs into the memory through that peripheral.

The operator also uses the switches and lights for diagnosing computer operations. Certain control switches enable the operator to examine and alter data in identified locations. Other switches enable the operator to analyze the execution of a computer program on a step-by-step basis.

Although consoles generally are found on all digital computers, they do introduce several drawbacks for the data processing system user. For example, an operator must be physically present at the digital computer site to initialize the digital computer or to perform diagnostic operations through the console. If a power failure or other operating problem occurs, only the operator can initialize or correct the problem. Again, the operator generally must be physically present at the digital computer site.

Moreover, the console panel includes a large number of switches and lights as console elements. These elements increase the manufacturing expense of the digital computer because the panel must be manufactured to support these elements and because these elements must be properly wired into the digital computer circuits. As the costs of the electronic circuits in a digital computer continue to decrease with the introduction of large scale and grand large scale integration manufacturing techniques, the console manufacturing expense can constitute a significant portion of the total cost of the digital computer.

Therefore, it is an object of this invention to provide a digital computer in which computer initialization and diagnostics are simplified.

Another object of this invention is to provide a digital computer in which initialization and diagnostic operations can be performed from a location which is remote with respect to the digital computer.

Still another object of this invention is to eliminate the need for complex switching and lighting arrangements used in conventional digital computer consoles.

SUMMARY

In accordance with this invention, signals which indicate an actual or forced power supply failure and subsequent re-energization cause a loading circuit to transmit address signals which divert the digital computer from its normal response to the energization of the power supply to an initialization routine permanently stored in the circuit. This initialization routine may include diagnostic and bootstrap programs for enabling subsequent operations to be performed without the need for the many switches and lights found on conventional consoles by enabling another peripheral at a remote location to emulate the console.

This invention is pointed out with particularity in the appended claims. The above and further objects and advantages of this invention may be better understood by referring to the following description taken in conjunction with the accompanying drawings.

DESCRIPTION OF AN ILLUSTRATIVE EMBODIMENT

Figure 1:
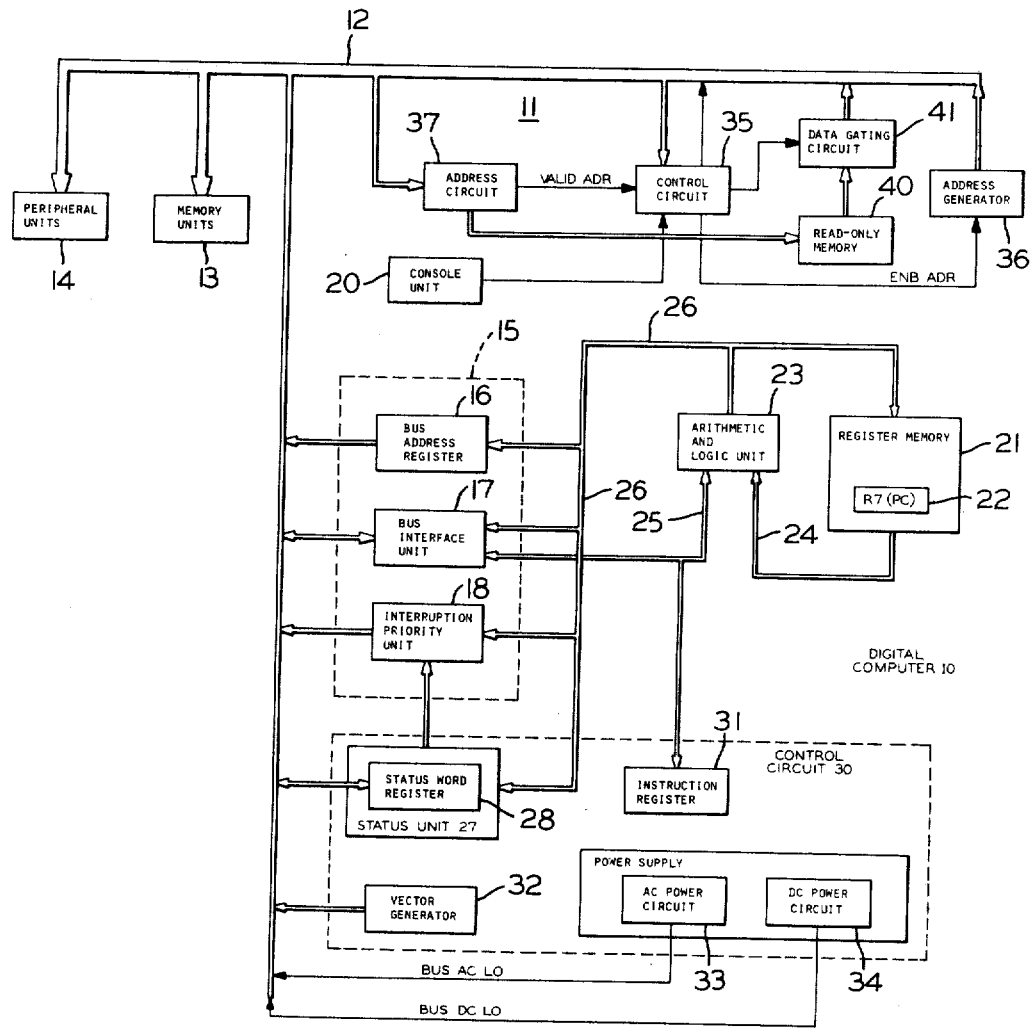
FIG. 1 is a schematic diagram of a digital computer, that is, modified by adding an initialization circuit constructed in accordance with this invention.

The data processing system illustrated in FIG. 1 includes a digital computer 10 and an initialization circuit 11 which are connected to a bus 12. Memory units 13 and peripheral units 14 also connect to the bus 12 to permit direct data and instruction transfers between them. One data processing system, constructed along the lines shown in FIG. 1, including the digital computer 10, memory units 13 and peripheral units 14, is a PDP11 data processing system which the assignee of the present invention manufactures and sells. The construction and operation of PDP11 data processing systems are described more fully in U.S. Pat. Nos. 3,614,740 and 3,614,741, both issued Oct. 19, 1971 and U.S. Pat. No. 3,710,324, issued Jan. 9, 1973.

In the embodiment described in the foregoing patents, the digital computer 10 connects to the bus 12 through a plurality of connections. The primary connection is through a bus interfacing unit 15 comprising a bus address register 16, a bus interface unit 17 and an interruption priority unit 18. Information in the form of data or instructions is transmitted to or received from locations constituted by the memory units 13 and peripheral units 14. Each location is defined by an address in the bus address register 16 and the data or instruction is transferred over the bus 12.

Conventionally, the bus address register 17 can transfer information to a console unit coupled to the bus 12 for display purposes. Alternatively, an address can be transmitted by the console unit onto the bus 12 for testing or other purposes. However, a conventional console unit is not required when the initialization circuit shown in FIG. 1 is added. Although FIG. 1 discloses a "console unit" 20, it is a simple and inexpensive unit as disclosed more fully later and it connects to the initalization circuit 11.

A register memory 21 comprises a control section and a plurality of storage registers. Only the R7, or PC, register 22 is shown in FIG. 1. This register is the program counter and is identified either as the R7 or PC register, depending upon its function.

An arithmetic and logic unit 23 receives inputs from the registers in the register memory 21 on a bus 24 and from the bus interface unit 17 on a bus 25. Output signals from the arithmetic and logic unit 23 are carried by a bus 26 back to the register memory 21, the bus address register 16, the bus interface unit 17, the interruption priority unit 18 or a status unit 27. The status unit 27 includes a status word register 28 and is located in a control circuit 30.

The status word register 28 shown in FIG. 1 stores a number of bits which define processor priority, previous operations, whether the digital computer 10 can be stopped or "trapped" after an instruction and other information. For example, bits 5, 6 and 7 may define one of eight operating priorities. T, N, Z, V and C bits indicate trapping, negative results, zero results, overflows conditions and the presence of a carry bit, respectively.

The control circuit 30 supervises information transfers within the digital computer 10. Generally instructions are coupled from the bus interface unit 17 to an instruction register 31 in the control circuit 30 by the bus 25. Other elements in the control circuit 30, but not shown, decode the instruction and produce timing signals thereby to control transfers of data within the digital computer 10.

The digital computer 10 executes an instruction in a sequence of operating cycles. During a "fetch" cycle, the control circuit 30 transfers the program count in the PC register 22 through the arithmetic and logic unit 23 to the bus address register 16 without modification. The program count also is incremented and returned to the PC register 22. In addition, the control circuit 30 performs a reading operation to transfer the contents of the location addressed by the bus address register 16 over the bus 12 and through the bus interface unit 17 into the instruction register 31 as an instruction. After the control circuit 30 decodes the instruction, it performs additional reading operations to transfer any operands into the register memory 21 or arithmetic and logic unit 23, if operands are required.

After the fetch cycle is completed, the digital computer 10 performs an "execute" cycle. During the "execute" cycle, the digital computer 10 responds to the operation code and, if necessary, performs a writing operation to transfer data to a designated location. During a subsequent "term" or "service" cycle, the control circuit 30 determines whether any conditions exist which require a diversion to an interruption routine or a "trap" routine. Reading and writing operations may be performed during any such routines. Thereafter, the digital computer 10 begins to process another instruction.

During a reading or writing operation, there are designated a "master" unit to control the operation and a "slave" unit to operate in response to signals from the master unit. The digital computer 10 and peripheral units 14 generally are capable of being master units or slave units while the memory units 13 normally operate only as slave units.

During a reading operation or a writing operation, the designated master unit asserts a BUSY signal and transmits address signals to identify a location in a slave unit, direction control signals to determine whether a reading or writing operation will occur and a master synchronization signal. If a writing operation is to occur, the master unit transmits the data simultaneously with the address and control signals. All units connected to the bus 12 receive the address signals but only the unit which properly decodes the address signals thereafter responds to the master unit as a slave unit.

When the slave unit receives the master synchronization signal, it loads the data on the bus 12 into the designated location or retrieves data from the designated location and transfers it onto the bus in response to the direction control signals. Then the slave units transmits a slave synchronization signal which causes the master unit to terminate the master synchronization signal. The slave unit senses the termination of the master synchronization signal and terminates the slave synchronization signal to complete the reading or writing operation.

The control circuit 30 also includes a vector generator 32 or equivalent means, an AC power circuit 33 and a DC power circuit 34. The AC power circuit 33 monitors the AC voltage applied to the digital computer 10 and transmits a BUS AC LO signal whenever AC voltage drops below a predetermined value. Likewise, the DC power circuit 34 transmits BUS DC LO signal whenever the DC logic voltage applied to various logic signals falls below a safe signal level.

When an operator initially energizes the digital computer 10 shown in FIG. 1, both the BUS AC LO and BUS DC LO signals are asserted. As the power supply stabilizes, the BUS DC LO signal terminates to indicate that the dc voltage is at an operating level. Then the BUS AC LO signal terminates to indicate that the ac voltge is at an operating level and the capacitors in the power supply have an ample charge. The control circuit 30 then initiates a "power up" operation during which two successive reading operations move two words of data from two successive locations identified by the vector generator 32 and load the two words of data into the PC register 22 and the status word register 28. In the PDP-11 digital computer, the two locations are $24_8$ and $26_8$. This initializes the digital computer 10, and the control circuit 30 performs a "term" or service cycle. Normally, the control circuit 30 fetches a next instruction (i.e., the first instruction in the "power-up" routine) from the location identified by the contents of location $24_8$.

In accordance with this invention, however, the initialization circuit 11 also responds to the BUS AC LO and BUS DC LO signals. When they terminate, a control circuit 35 transmits an ENB ADR signal. An address generator 36 responds by transmitting overriding high-order address bits onto address conductors in the bus 12. These address signals from the address generator 36 appear on the address conductors of the bus 12 simultaneously with the signals from the vector generator 32. Both sets of address signals are thereby combined in an inclusive OR operation. As only a slave unit identified by the address signals on the bus can respond during reading operations, the information stored at the locations identified only by the address from the vector generator 32 is not retrieved. In this case an address circuit 37 responds to the combined address signals by asserting a VALID ADR signal to designate the initialization circuit 11 as the slave unit.

When the control circuit 35 receives the master synchronization signal from the bus 12 and the VALID ADR signal is asserted, the initialization circuit 11 performs a reading operation. Thus, during this power-up operation the digital computer 10 receives new data for the program counter 22 and the status word register 28 from the read-only memory 40 through a data gating circuit 41, and not from the normally designated locations "$24_8$," and "$26_8$". Thereafter instructions in the read-only memory 40 control the digital computer 10 until the routine or routines stored in the memory have been executed.

The read-only memory 40 contains a number of discrete routines which perform diverse functions during the initialization procedure. For example, there is a routine for diagnosing the operation of the digital computer 10. This routine tests the digital computer response to all the instructions in sequence. If a failure occurs, the routine triggers an alarm, as by printing out a message. When all the diagnostic tests are met, the initialization circuit 11 may enter another routine for "emulating" a conventional console unit through an input/output peripheral unit, such as an input/output typewriter or cathode-ray tube display unit and keyboard.

While the foregoing operation permits an input/output peripheral unit to emulate a conventional console unit, it is also possible to bootstrap other types of peripheral units, such as disk memories, magnetic tape memories or paper tape readers. These peripheral units may be bootstrapped automatically or through the input/output peripheral unit which emulates the conventional console unit.

Once all the operations for initializing the digital computer have been completed, control of the digital computer passes either to a program in the bootstrapped peripheral unit or back to the program stored in the memory 40 to enable further control through the console unit emulating peripheral unit.

Figure 2:
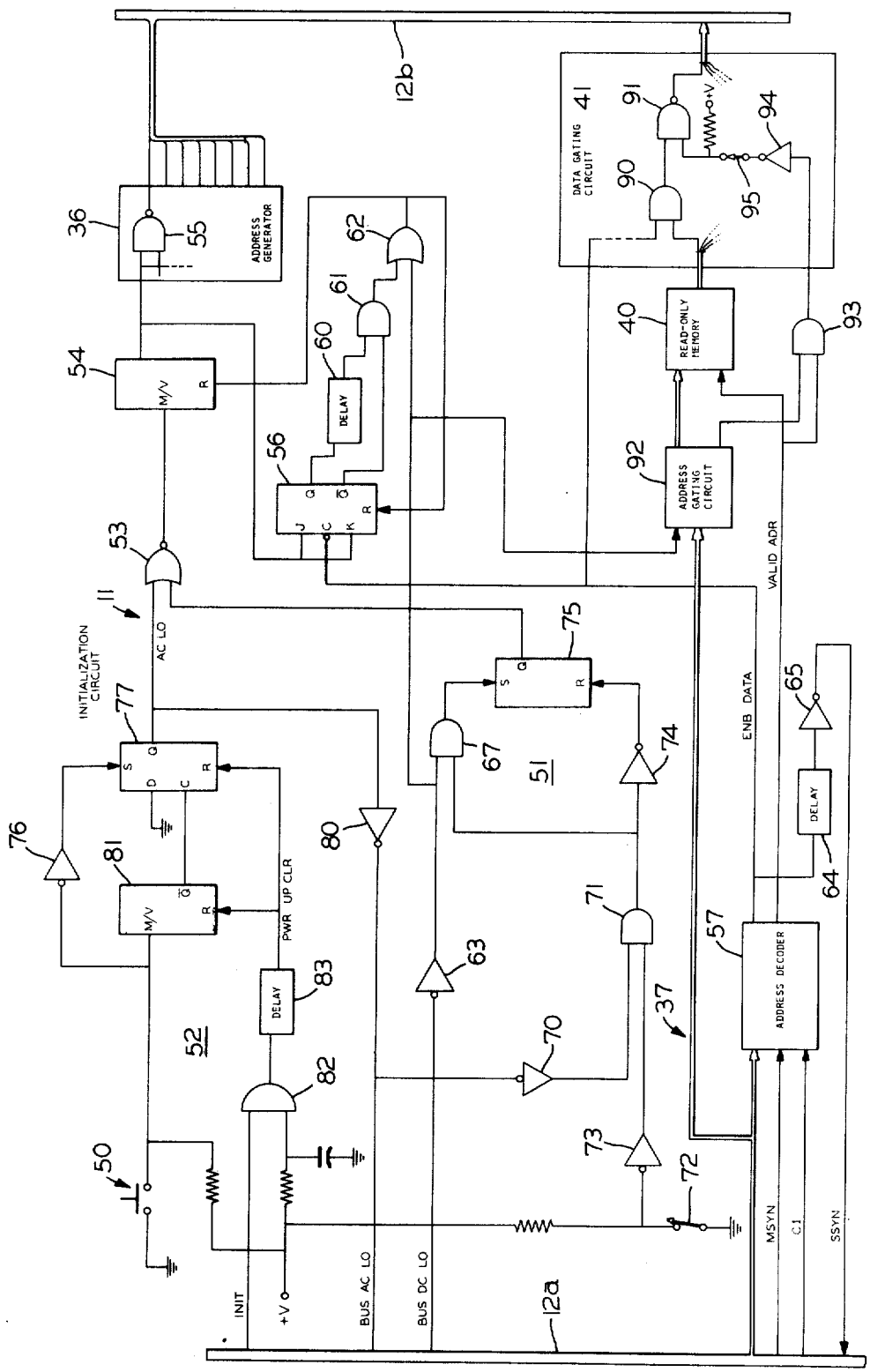
FIG. 2 is a detailed schematic diagram of a portion of the initialization circuit shown in FIG. 1.

Portions of the bus 12 in FIG. 1 are shown in two locations, as bus 12a and bus 12b in FIG. 2, in order to simplify the circuit drawing. Each bus contains data, address and control conductors as described in the above-identified patents. For purposes of this discussion, it is assumed that signals on the bus are "ground assertion" signals. That is, the signal is at a ground potential when it is TRUE and is at a positive potential when it is FALSE. 12b.

The initialization circuit 11 shown in FIG. 1 is activated either when the BUS AC LO and BUS DC LO signals terminate or when the operator depresses a boot switch 50 (FIG. 2) normally located at the console unit 20. In either situation, a sensing circuit 51, which monitors the BUS AC LO and BUS DC LO signals, or a sensing circuit 52, which monitors the external boot switch 50, energizes a NOR gate 53 thereby to transmit a ground assertion signal to a monostable multivibrator 54. As only a positive-going transition of this signal from the NOR gate 53 triggers the multivibrator 54, the multivibrator remains inactive. When both the BUS AC LO and BUS DC LO signals revert to a non-asserted level, the NOR gate 53 triggers the multivibrator 54. The multivibrator 54 then transmits a fixed duration pulse which exceeds the interval required to perform the two initial reading operations which the digital computer 10 performs as part of a power-up operation. This pulse enables the address generator 36 to transmit an overriding, or offsetting, address onto address conductors in the bus 12b.

More specifically, the address generator 36 comprises a plurality of inverting gates, such as a NAND gate 55, which transmit the ground assertion signals whenever the multivibrator 54 is in its astable state. The multivibrator 54 also conditions a JK flip-flop 56 to be complemented in response to any clocking input represented by an ENB DATA signal from an address decoder 57 in the address circuit 37.

The address generator 36 depicted in FIG. 2 transmits high-order address bits onto the address conductors in the bus 12b. Assuming, for example, that the vector generator 32 in FIG. 1 transmits the number "$00024_8$", the address generator 36 transmits, for example, either $773xxx_8$ or $765xxx_8$. The two numbers are concatenated to provide an offset address (e.g., 773024 or 765024) which the address decoder 57 decodes. Thus, during the initial part of a power-up operation the address decoder 57 receives the offset address signals, a direction control signal C1 indicating a reading operation and a master synchronization (MSYN) signal. Whenever these signals coincide, the address decoder 57 asserts the ENB DATA signal. Although this signal is coupled to the flip-flop 56, the positive-going transition does not affect the state of the flip-flop 56. When the MSYN signal terminates after the first transfer to the program counter, the ENB DATA signal also terminates and sets the flip-flop 56 as both the J and K inputs are energized by the multivibrator 54. After the new status word is transferred over the bus 12, during the second reading operation, the MSYN and ENB DATA signals terminate again thereby to reset the flip-flop 56. When the flip-flop 56 is reset, a delay circuit 60 and an AND gate 61 energize an OR gate 62 for an interval determined by the delay circuit 60 to clear the multivibrator 54 and terminate the overriding address signals. The OR gate 62 also is connected to an inverter 63.

Now referring to the address decoder 57 in FIG. 2, a delay circuit 64, energized by the ENB DATA signal, and an inverter 65 transmit onto the bus 12a a ground assertion slave synchronization (SSYN) signal during each reading operation.

As now apparent, during the power-up operation for the interval during which the PC register 22 and status word register 28 in FIG. 1 receive new data, the multivibrator 54 transmits overriding address signals. These signals cause the new data to be retrieved from locations in the read-only memory 40 rather than the normally accessed locations.

Now referring to the sensing circuit 51, when power is initially applied, both the BUS DC LO and BUS AC LO signals are asserted. Thus, the inverter 63 enables an AND gate 67 and energizes the OR gate 62. Likewise, an inverter 70 enables an AND gate 71. If an enabling switch 72 is closed, an inverter 73 energizes the AND gate 71 thereby terminating an overriding reset signal which an inverter 74 applies to a latch 75. Simultaneously the AND gate 71 also energizes the AND gate 67, sets the latch 75 and de-energizes the NOR gate 53. When the BUS DC LO signal terminates, the inverter 63 disables the AND gate 67 and removes the setting signal from the multivibrator 54. During this interval, the latch 75 remains set. However, when the BUS AC LO signal terminates, the AND gate 71 is deenergized. The inverter 74 resets the latch 75, and the NOR gate 53 triggers the multivibrator 54. Thus, the sensing circuit 51 triggers the multivibrator 54 each time power is applied to the initialization circuit 11.

An operator also can employ the initialization circuit 11 even when the power supply is operating. Such an operation may be necessary if the digital computer 10 processes an endless loop or executes a HALT instruction. The operator actuates the external boot switch 50 thereby to produce a negative pulse at the input to an inverter 76 and to set a flip-flop 77. When the flip-flop 77 sets, it asserts an AC LO signal that is converted to a BUS AC LO signal by an inverter 80. Simultaneously, the flip-flop 77 energizes the NOR gate 53. When the switch 50 is released, a signal transition on the trailing edge triggers a monostable multivibrator 81. After the interval determined by the multivibrator 81 expires, the flip-flop 77 is clocked to a reset condition and thereby terminates the AC LO and BUS AC LO signals. This de-energizes the NOR gate 53 and triggers the multivibrator 54.

When the digital computer 10 is initially energized or executes a RESET instruction, it transmits an INIT signal. The INIT signal energizes an AND gate 82 and delay circuit 83 thereby to produce a PWR UP CLR pulse which resets the flip-flop 77 and multivibrator 81.

Thus, either of the foregoing procedures causes the digital computer to transfer to a power up operation. Once the transfer is complete, the digital computer 10 operates in response to the contents of the read-only memory 40. The contents of any location in the memory 40 are transferred to the digital computer 10 through the data gating circuit 41 during both the transfer and subsequent execution of the programs in the memory 40. The data gating circuit 41 comprises a number of gates corresponding to each bit position in the read-only memory 40. Circuitry associated with one such bit position is shown in detail.

Whenever the digital computer 10 "reads" the contents of a location in the read-only memory 40, the ENB DATA signal from the address decoder 57 enables an AND gate 90 and a normally enabled NAND gate 91 to transfer the corresponding bit signal onto the bus 12b as a ground assertion signal. In a simple initialization circuit, a single routine could be executed by having address signals from the address generator 36 provide the overriding resetting signals. However, more flexible operation can be achieved if different routines can be selected by the operator. A typical group of routines is described later with respect to FIG. 3.

FIG. 2 also depicts, in the data gating circuit 41, switches which control the low-order bit signals which are transmitted onto the bus 12b. Whenever an address corresponding to the offset location which contains the new program counter contents is addressed, (i.e., $773024_8$ if the address generator 36 transmits $773xxx$ and vector generator 32 in FIG. 1 transmits $024_8$), an address gating circuit 92 and VALID ADR signal energize an AND gate 93 and inverter 94. A switch 95, which is one of a plurality of selector switches, controls the corresponding bit signal which the NAND gate 91 transmits onto the bus 12b. If the switch 95 is closed, the inverter 94 grounds the switched input to the NAND gate 91; and the NAND gate 91 forces a FALSE signal onto the bus 12b. If the corresponding selector switch 95 is open, there is no change in the output from the read-only memory 40. Circuits corresponding to the inverter 94, switch 95 and NAND gate 91 connect to the output corresponding to low-order bit positions in words retrieved from the memory 40 to effect the transfer. Thus, if all the switches are closed, the program counter and status word register receive new contents from addresses corresponding to the concatenation of the high-order bits from the address generator 36 and the vector generator 32 (e.g., from locations 773024 and 773026). However, if any of the selector switches are open, the program counter receives new contents of some other vectored location from the read-only memory 40. This vectored location will be addressed anytime the address gating circuit 92 and VALID ADR signal energize the AND gate 93.

Figure 3:
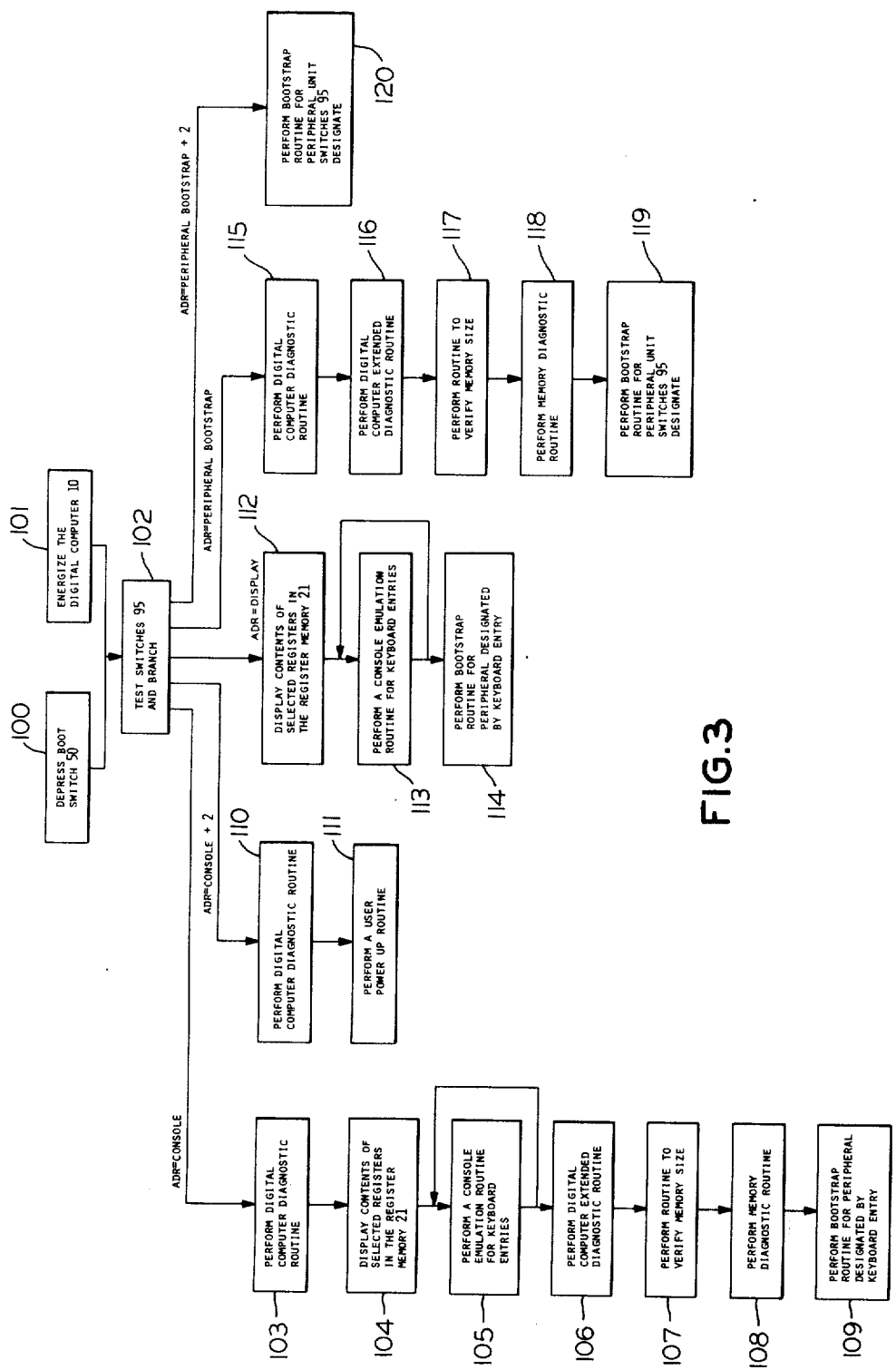
FIG. 3 is a flow diagram to illustrate the operations which can be performed in response to instructions contained in a read-only memory in the circuit of FIGS. 1 and 2.

FIG. 3 graphically depicts the operations of the initialization circuit 11 in response to various settings of the switches 95 in the data gating circuit 41. As shown in FIG. 3, the operation begins as previously described by depressing the boot switch 50 (FIG. 2) in block 100 or energizing the digital computer 10 in block 101. The instructions in the read-only memory 40 then test the switches 95 and branch according to their value in block 102. If the switches 95 are set to designate a console emulation routine (i.e., ADR=CONSOLE) the system branches to block 103 and diagnoses the operation of the digital computer 10. This includes exercising the digital computer 10 in reponse to each of the instructions in the digital computer instruction set. If the digital computer 10 passes the diagnostic tests, the circuit 11, in block 104, displays the contents of registers in the register memory 21 (FIG. 1) on an input-/output peripheral unit such as a teletypewriter. Then the system enters a console emulation routine represented by block 105. This routine enables all the functions of a conventional console unit, with all its switches and lights, to be performed using the teletypewriter or other conventional input/output device. Designated keys perform the console switch functions. Signals which normally energize the lights are converted and printed or displayed on the input/output device.

During the console emulation routine the operator enters a code which identifies a bootstrap routine for another particular peripheral unit. Before the digital computer 10 performs the corresponding routine, however, the read-only memory 40 provides instructions for performing an extended diagnostic routine for the digital computer (block 106). In addition, the memory 40 may contain routines for verifying the memory size in block 107 and for performing a memory diagnostic routine thereby to assure the operator that the memory is operational in block 108. Then the digital computer executes the bootstrap routine in (block 109) selected by the entry code.

If the switches 95 are set to a value corresponding to ADR=CONSOLE+2, the digital computer 10 performs the steps in blocks 110 and 111. Block 110 corresponds to a digital computer diagnostic routine in block 103. Then a user power up routine, which the user provides, is executed in block 111.

If the operator merely wishes to display the contents of the desired register, the switches 95 are set to a value corresponding to ADR=DISPLAY whereupon the digital computer 10 transfers from block 102 to block 112 and displays the contents of selected registers. This is identical to the block 104. The console emulation routine in block 113 and bootstrap routine in block 114 correspond to blocks 105 and 109, respectively. Thus, this sequence of routines eliminates blocks 103, 106, 107 and 108 in the CONSOLE sequence.

Any number of diverse peripheral units 14 can connect to the digital computer 10. These include magnetic tape memories, magnetic disk memories, paper tape readers, teletypewriter, and other similar devices. If the test switches 95 are set to an address corresponding to one of these peripheral units (i.e., ADR=PERIPHERAL BOOTSTRAP) the system branches to block 115. Blocks 115, 116, 117 and 118 correspond to blocks 103, 106, 107 and 108, respectively. Once these routines have been completed, the digital computer executes a bootstrap routine for that peripheral unit as designated by the selector switches 95 in block 119.

Another example of the response of the digital computer to setting of the switches 95 occurs if the address identifies any one of the locations designated as ADR=PERIPHERAL BOOTSTRAP+2. When any such switch setting exists, the digital computer merely processes the designated bootstrap routine (block 120) and omits the routines which perform the digital computer and memory diagnostics. For example, if the power fails at a remote site with no operator present, the foregoing sequence will, when the power is restored, automatically initialize the digital computer and again bootstrap the designated peripheral unit.

In summary, there is provided an initialization circuit which eliminates the need for the expensive console units in digital computers. This initialization circuit operates automatically in response to the application of power to the computer or in response to an externally operated switch. It can perform a number of different operations including digital computer diagnostic operations as well as bootstrap operations. If a console emulation routine is included, a keyboard device, such as a teletypewriter, with both input and output capabilities can be substituted for these switches and lights normally associated with conventional consoles.

In the automatic mode, there is no need for an operator to initialize the digital computer. Moreover, the external bootstrap switch can be remotely located with respect to the digital computer thereby to further increase the flexibility of the digital computer. In addition, the disclosed circuit reduces console costs. A console unit 20 such as shown in FIG. 1 requires only a boot switch 50 (in FIG. 2), a power switch, a HALT/CONTINUE switch, an ac power light, a dc power light and, if the memory is a semi-conductor memory with a battery back-up power supply, a battery status light.

It will also now be apparent that a specifically disclosed circuit 11 in FIG. 2 is an illustrative embodiment of this invention adapted for use with a specific digital computer, namely a PDP-11 digital computer. The circuit 11 can be modified for operation with other digital computers.

FIG. 3 is a generalized diagram which depicts alternative operating modes for the initialization circuit 11. It will be apparent, however, that the circuits can be modified and that the flow diagrams can be altered while still affording some or all the benefits and advantages of this invention. Therefore, it is the object of the appended claims to cover all such variations and modifications as come within the true spirit and scope of this invention.

What is claimed as new and desired to be secured by Letters Patent of the United States is:

1. An initialization circuit for loading initial information including data and instructions defining a predetermined operating condition into a digital computer system that includes a bus, a power supply, first means for transmitting address signals onto the bus when the power supply initially is energized, means for transmitting a power supply status signal onto the bus and means for transmitting and receiving transfer control signals onto and from the bus to transfer information over the bus, said initialization circuit comprising:

A. memory means including a storage location containing the initial information and instructions for loading the initial information onto the bus for transfer to the digital computer system, B. address generator means for transmitting address signals onto the bus, and C. control means connected to the bus, said address generator means and said memory means for controlling transfers of information from said memory means, said control means including:

i. means responsive to the power supply status signal from the bus for enabling said address generator means to transmit address signals onto the bus simultaneously with the transmission of address signals from the first address signal transmitting means in the digital computer system thereby to produce combined address signals that designate a said storage location in said memory means, and ii. transfer means responsive to certain of the control signals and the combined address signals on the bus for transferring the contents of said storage location in said memory means over the bus to the digital computer system thereby to establish the predetermined initial operating condition in the digital computer system.

2. An initialization circuit as recited in claim 1 wherein the digital computer system includes means for transmitting, as certain of the transfer control signals, signals designating a reading operation during the time the contents of one of said storage locations identified by address signals on the bus are transferred to the digital computer system and wherein:

A. said memory means includes a plurality of said storage locations, each said storage location having an identifying address, B. said transfer means includes:

a. an address decoder for generating a valid address signal whenever the address signals on the bus correspond to the address for one of said storage locations in said memory means and certain of the control signals designate a reading operation, and b. transfer control means responsive to the valid address signal from said address decoder for transferring the contents of the addressed one of said storage locations in said memory means onto the bus.

3. An initialization circuit as recited in claim 2 wherein said memory means comprises:

i. a read-only memory responsive to the address signals from the bus for generating signals representing the contents of the addressed one of said storage locations, and ii. gating means connected to said read-only memory and to said control means for coupling the contents of the addressed one of said storage locations in said read-only memory onto the bus.

4. An initialization circuit as recited in claim 3 wherein:

i. said gating means includes, for each of a plurality of preselected signals from said read-only memory, a. switch-operated enabling means for generating an enabling signal, and b. gating means responsive to a signal from said control means, a corresponding signal from the read-only memory and the enabling signal from said switch-operated enabling means, and ii. said address decoder includes means responsive to a predetermined address for energizing each said enabling means thereby to load a signal onto the bus which overrides the corresponding signal from said read-only memory.

5. An initialization circuit as recited in claim 1 additionally comprising:

E. means for transmitting an overriding power supply status signal whereby said address generator enabling means causes an overriding address signal to be transmitted onto the bus, and F. switch means for energizing said overriding power supply status signal transmitting means.

* * * * *